DOCUMENT ALIGNMENT ARRANGEMENT

Filed Dec. 23, 1965 3 Sheets-Sheet 1

INVENTORS
BAISEL L. EVELAND
RICHARD E. SEEGER
BY
John J. McCormack
ATTORNEY

DOCUMENT ALIGNMENT ARRANGEMENT

INVENTORS
BAISEL L. EVELAND
RICHARD E. SEEGER
BY
John J. McCormack
ATTORNEY

DOCUMENT ALIGNMENT ARRANGEMENT

Filed Dec. 23, 1965 3 Sheets-Sheet 3

INVENTORS
BAISEL L. EVELAND
RICHARD E. SEEGER
BY
John J. McCormack
ATTORNEY

United States Patent Office 3,379,435
Patented Apr. 23, 1968

3,379,435
DOCUMENT ALIGNMENT ARRANGEMENT
Baisel L. Eveland, Medfield, and Richard E. Seeger, Marblehead, Mass., assignors to Honeywell Inc., Minneapolis, Minn., a corporation of Delaware
Filed Dec. 23, 1965, Ser. No. 516,034
14 Claims. (Cl. 271—61)

ABSTRACT OF THE DISCLOSURE

A height-adjustable aligning assembly for referencing the top plane of a stack of cards in an "in-hopper" portion of a card handling apparatus, this assembly including a cover plate adapted to "tamp" the card stack, aligningly, in the hopper, being mounted on a vertically-adjustable frame for manual height adjustment. According to embodiment features, the cover plate is made "self-clearing," away from the stack after aligning contact therewith and the frame is made "self-locating" to "hold" any selected height (such as for various card sizes) using a drag brake arrangement.

The present invention is directed to container means for aligning stacks of unit records in prescribed relation with associated transport means and with associated control means; and more particularly, to a self-locating, record alignment means and associated suspension means.

A general object of the present invention is to provide new and improved apparatus for feeding documents from a stack in aligned fashion into utilization apparatus for processing data representations thereon. More specifically, the invention is concerned with such apparatus which is characterized by the ability to handle documents of widely varying height and weight. The invention provides guide means arranged to automatically maintain a prescribed edge of a document stack aligned along a selectable reference level. A related object is to provide such apparatus wherein the document stack is arranged to normally "hide," i.e. obstruct access to, a transport control so as to prevent further insertion of documents when the control is activated.

Data processing document selection devices, such as card pickers and the like, are widely used to select the documents singly from a stack and insert them into a utilization device for interpreting information recorded thereon and for other data processing functions. In handling such stacks of documents, speed and convenience are vital, especially for electronic data processing applications. That is, one must be able to stack and align documents in an input hopper as fast and conveniently as possible. Further, the required high handling speeds cannot compromise the accuracy of document alignment; especially in view of the trend to packing more and more data onto a document whereby a very slight misalignment thereof can cause reading errors. The invention provides a solution to such problems as will now be described more particularly relative to FIGURE 1.

FIGURE 1 illustrates a portion of a document handling device for data processing as known to those skilled in the art. Here, it will be understood that a stack of cards ST (shown in phantom), or other like-dimensioned documents, will be disposed in alignment on a reference deck, or base, 10 to be thrust, singly, by picker means, such as picker rolls PR, through a throat passage (defined by throat adjusting means TM) into engagement with utilization means, such as transport drum AR. Drum AR may be provided to translate the cards in prescribed constant alignment past an output means, such as a card reader, mark sensor or the like. It will be understood that the reference position of each document along transport drum AR must be kept constant within very close tolerances. For instance, slight variations in vertical position of data marks (of the record) can render the output from mark sensing devices inaccurate and useless. It will further be understood that height alignment (along vertical axis V) may be assured by aligning the bottom edges of every document in stack ST flush against deck 10, given documents of prescribed identical size and code positioning. Of course, alignment against reference deck 10 may be manually provided, aided by manually jogging the top edge of stack ST against deck 10. However, this vertical alignment cannot normally be maintained, given the usual disturbing operations of the document handling means. For instance, picker rolls PR while snatching the foremost document, can commonly engage it unevenly so that, during acceleration toward drum AR, it may be given slight upward (skewing) thrusts. Without some sort of upper guide means, the translated document may be misaligned and the following documents likewise, especially after a number of such "skew-picks." The problem, then, is to provide such a top guide means, while also making it conveniently accessible for document insertion, adjustable for documents of differing height (preferably being self-locating there), capable of guiding without drag on the document (preferably being self-clearing), etc. The present invention provides an improved document aligning means having such multiple capabilities and including a self-locating aligning assembly 11 for manual alignment operations, to thus increase the accuracy of record alignment without degrading either the convenience or the speed of handling.

Of course, prior art card hoppers have commonly included aligning means of one kind or another; such as fixed reference surfaces against which a document stack may be thrust into alignment. One problem associated with such fixed guides, however, is that of clearance. For example, if in FIGURE 1, top guide plate 15 were fixed, its capability to guide documents stacked thereunder would be relatively crude since tight engagement thereof against the top of stack ST would obstruct their translation; further, it could only "guide" documents of a single fixed height. The present invention obviates these difficulties by providing a vertically-adjustable guide means which is self-locating and "self-clearing." Thus, plate 15 may be engaged intimately against the top edges of the document stack temporarily for referencing purposes but thereafter will automatically disengage itself, a prescribed "offset" or clearance.

Complicating this problem of aligning documents without impeding their translation, is the second problem of providing capability for handling and aligning a wide variety of document sizes. Since a large number of computer users find it advantageous to process records of different dimensions on a single versatile record handling device, it has become highly advantageous for the record input stage thereof to include adjustable-dimensioned alignment means. For instance, a customer may often wish to read stacks of relatively thick, large billing cards (e.g. punched cards of a Utility, a Telephone Company, etc.) and immediately thereafter read check receipts, which are relatively narrow and flimsy, on the same machine and with a minimum of machine adjustment. The present invention provides such versatility in an automatic self-leveling, self-clearing alignment means adapted for use with variously-dimensioned documents.

Workers in the art will recognize that such an improved alignment means should be adaptable for use with a wide variety of document handling devices, and moreover, should be rugged since it will at times be subjected to considerable abuse by attendants. Such handling devices may comprise terminal computer input units which, because so many are typically required, are necessarily made simple and inexpensive. The present invention provides a self-leveling, self-clearing document alignment device which, despite its improved functions, is nonetheless ruggedized for heavy operator use and simplified for lower cost. Workers in the art will appreciate that the novel design of the invention has been achieved with a surprisingly practical arrangement, requiring no unconventional, hard-to-get, components; and also specifying components which are known for their reliability and long life.

While the novel alignment means referred to above is seen to provide a new improved document injection arrangement, it will also be recognized as advantageously suited for cooperation with document transport means, such as in cooperative relation with transport controls. For instance, transport arrangements in data processing machines are commonly provided with a "run-out" control which allows for the ejection of internal (intra-transport) documents when the machine is shut down. The art has long awaited a simple document handling device that is fail-safe in this "run-out" mode. That is, during "run-out," it is necessary for the operator to remove the input document stack (such as stack ST in FIGURE 1) to assure that no more documents will be fed into a "dead" machine. Where prior art machines are commonly subject to run-out error since operators often forget this procedure; the alignment arrangement 11 according to the invention, in cooperation with a run-out switch 1 advantageously disposed in relation therewith, is arranged to be fail-safe by normally obstructing access to switch 1 when stack ST is under assembly 11. This assures that the operator will remove the stack ST before "run-out" is invoked. Thus, with a novel but simple arrangement of parts, the invention can automatically prevent an operator from accidentally feeding cards during "run-out."

The foregoing and other objects are achieved and advantageous features provided according to the invention by providing a manually depressible alignment assembly mounted on a self-locating plunger arrangement and including guide means arranged to overhang a card stack to be self-clearingly tilted up away from the stack; together with control means, access to which is obstructed by the way in which this alignment assembly engages a document stack thereunder.

The various features of novelty which characterize the invention are pointed out with particularity in the claims annexed hereto and forming a part of the present specification. For a better understanding of the invention, its advantages and specific objects attained with its use, reference should be had to the accompanying drawings and related description of preferred embodiments thereof, being clearly described so as to enable one skilled in the art to make and use the invention. Referring to the drawings, wherein like reference numerals denote like parts:

Figure 1:
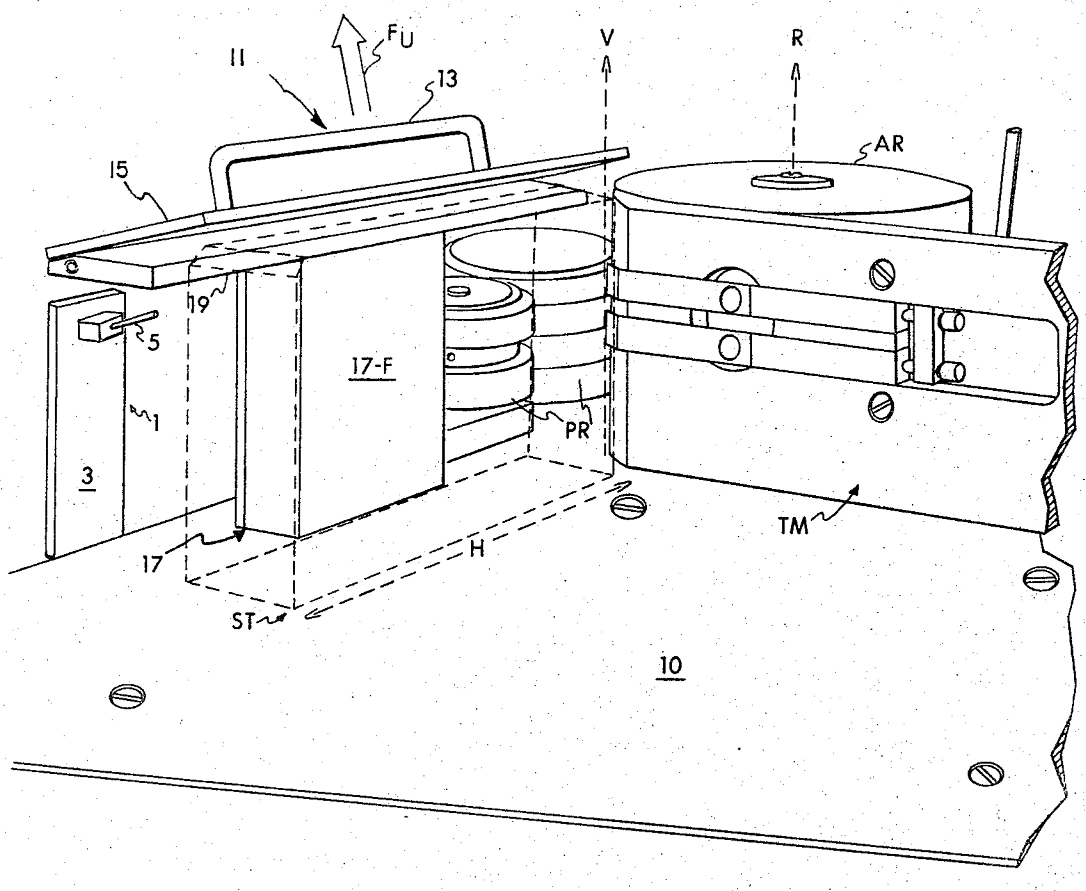
FIGURE 1 is a front perspective view of a document-handling arrangement incorporating the invention.
Figures 4, 5:
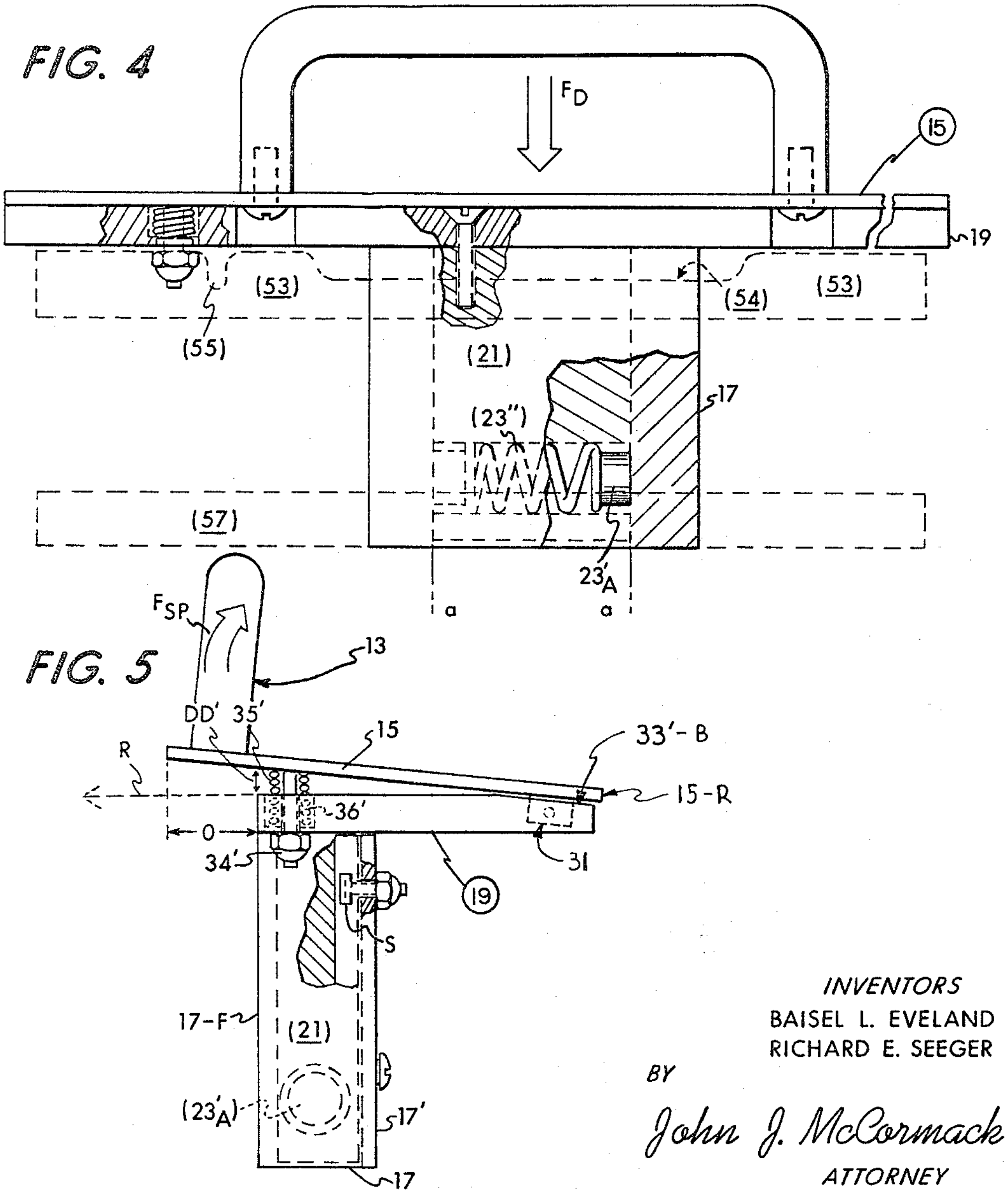
FIGURE 4 is a front elevation, in partial section, of the assembly in FIGURE 3.
FIGURE 5 is a side elevation, in partial section, of the assembly in FIGURE 3.

Referring first to FIGURE 1, alignment assembly 11 is shown as an embodiment of the invention providing the above indicated advantages. The structure of assembly 11 will be best understood by first briefly describing how it is typically used. An operator will select a stack of like documents of identical height to be processed by the subject arrangement. As is customary, he will joggle them against deck 10 to align horizontal edges (along axis H) and especially vertical edges (along axis V). Then, gripping the handle 13 of alignment assembly 11 he will pull upward (force vector $F_u$) to provide clearance under the overhanging guide plate 15 thereof for the document stack which will be positioned thereunder, as indicated in phantom at ST. The stack will be located and aligned laterally by thrusting the stack ST against a fixed pillar portion 17 of assembly 11, maintaining it so with resilient pusher means (not shown), as is customary. Pillar 17 has a front card-engaging face 17–F of prescribed size and orientation. Face 17–F is disposed so that when card stack ST is engaged therewith, the foremost document in stack ST, contiguous with face 17–F, may be thrust, by picker rolls PR, along reference deck 10 through the picking throat in prescribed vertical alignment for advancement by transport drum AR. Thus, as is conventional picker rolls PR will successively select documents from stack ST and thrust them, aligned, into engagement with following translation means AR for utilization purposes. As will be particularized below relative to FIGURE 2, the top guide plate 15 of alignment assembly 11 is mounted pivotably on a base plate 19 to be tiltingly spaced therefrom a prescribed amount. Plate 19 is, in turn, mounted rigidly on a plunger 21 so as to be manually translatable vertically, plunger 21 being slidingly and guidedly disposed within pillar 17. Also shown is a run-out switch 1 mounted from a bracket 3 so as to be nestled under base plate 19 at its bottom-most alignment-location so that switch lever 5 thereof projects toward stack ST adjacent pillar face 17–F, but slightly recessed behind the plane thereof, so that stack ST will hide it when engaged with assembly 11, obstructing operator access thereto. The operating states of assembly 11 are indicated in FIGURES 1, 4 and 5, namely as "pulled-up," "pushed-down" and "at rest," respectively, being acted upon by forces $F_u$, $F_d$ and $F_{sp}$, respectively.

Figure 2:
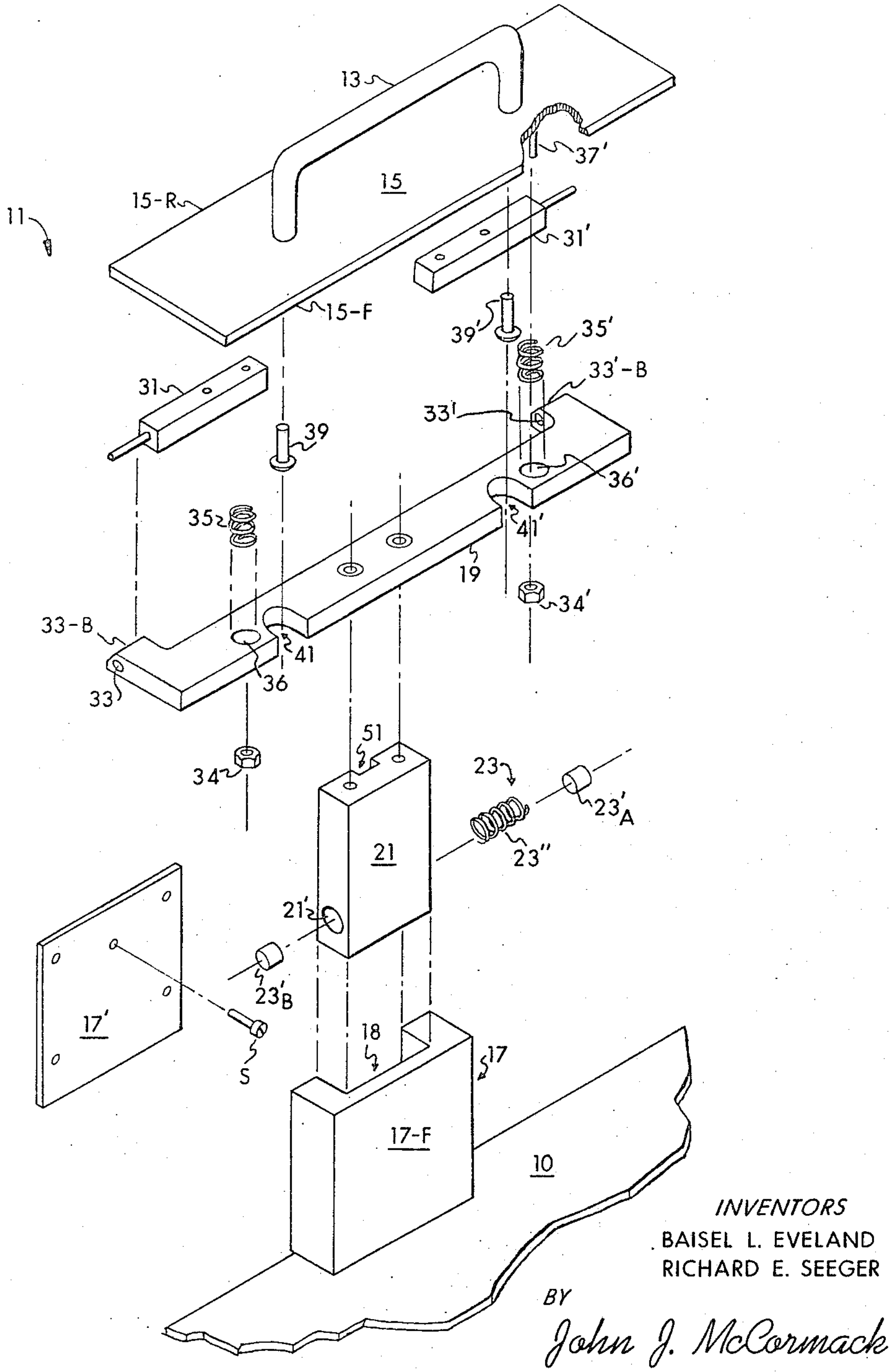
FIGURE 2 is a top perspective exploded view of the document aligning assembly in the arrangement of FIGURE 1.
Figure 3:
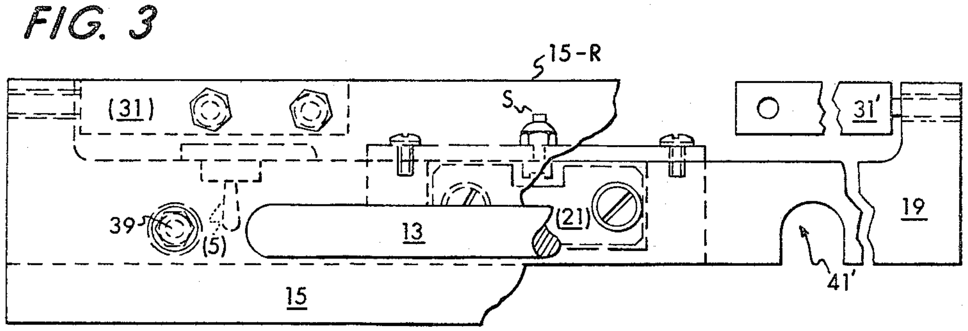
FIGURE 3 is a somewhat schematic plan view of the parts in FIGURE 2, as assembled.

Referring now to FIGURE 2 wherein aligning assembly 11 is shown exploded and in more detail, it will become apparent to those skilled in the art, that a self-leveling, self-clearing adjustable top guide means is here provided. As indicated, assembly 11 generally comprises a mounting frame, or base plate, 19, together with a guide plate 15 mounted thereon and a slide plunger 21 rigidly depended therefrom, and also a fixed pillar 17, in which plunger 21 is locatingly engaged for self-locating, sliding engagement along a channel 18 cut therein. Frame 19 carries plate 15 in self-clearing, relation thereon, that is, plate 15 is secured pivotably on frame 19, its forward edge 15–F being urged pivotingly therefrom with excursion limits defined by stop means, as detailed below.

More particularly, pillar 17 is mounted rigidly on deck 10 so that the card-engaging face 17–F thereof will align an adjacent document in stack ST precisely along the reference "injection-plane" defined by the throat aperture between throat (knife) adjust means TM and picker rollers PR. Slide channel 18 is cut uniformly along the vertical length of pillar 17 (along axis V); being closed by back plate 17′ affixed to pillar 17. Channel 18 is thus formed to conform closely with the uniform cross-section of plunger 21 which may therefore be smoothly slid therealong, kept aligned along axis V. Preferably, a stop S is removably mounted on plate 17′ to protrude inwardly into channel 18 sufficiently to cooperate with a stop channel 51 in plunger 21 provided to terminate the upward excursion of plunger 21 at a prescribed (maximum) elevation. This prevents upward thrusts ($F_u$) from removing plunger 21 from pillar 17. Plunger 21 includes a brake bore 21′ cut transversely therethrough and arranged to receive a brake assembly 23. Brake assembly 23 may comprise a brake spring 23″ and a pair of cooperating cylindrical brake pads 23′A, 23′B, disposed outboard of spring 23″. It will be seen that spring 23″ may be inserted in guide bore 21′ so as to engage pads 23 and continually thrust them brakingly against opposite sidewalls of channel 18 to make assembly 11 vertically self-locating. Brake assembly 23 may desirably be comprised of simple, readily-available components; for instance, spring 23″ may comprise a helical coil of spring steel or the like with a prescribed spring constant; while pads 23'A, 23'B may be formed of asbestos, frictional ceramic or the like. Thus the force of spring 23" and the frictional characteristic of pads 23' against the sides of channel 18 are chosen so as to be barely sufficient to maintain assembly 11 stationary at manually-selectable elevations and to be easily overridden by manual forces ($F_u$, $F_d$) on handle 13. Of course, equivalent brake means, as will occur to those skilled in the art, may be employed to provide this self-locating function.

Top guide plate 15 is secured to base plate 19 to be tiltingly pivoted relative thereto, within limits as mentioned so as to be self-clearing away from stack ST after engagement therewith. Thus, plate 15 may be secured along a back side 15–R thereof to a pair of opposingly disposed pivot mounts 31, 31', such as by machine screws. Pivot mounts 31, 31' include a pair of rigid axle portions projecting therefrom for journaling disposition in a pair of conforming journal bores 33, 33' through a pair of tab extensions of plate 19, being affixed therein by cotter pins or the like. These tabs are beveled as indicated at 33–B, 33'–B. Thus, pivot mounts 31, 31' allow plate 15 to engage plate 19 coplanarly in one state and, in a second state, to be pivoted therefrom at its forward edge 15–F, beveled sections 33–B, 33'–B allowing the rear edge 15–R of plate 15 to "clear" plate 19 during pivoting. The front edge 15–F of plate 15 is continually urged to pivot away from plate 19 by resilient means, such as a pair of upset springs 35, 35', seated in conforming recesses 36, 36' in plate 19. Springs 35, 35' are held aligningly in recesses 36, 36' respectively by a pair of threaded studs 37 (not shown) and 37', arranged to be threaded coaxially through an associated spring and through a bore in the bottom of an associated recess, being adjustably compressible therein by nuts 34, 34'. Tightening adjustments of nuts 34, 34' may thus vary the compression of an associated spring. Springs 35, 35' must of course be selected to provide sufficient upward force ($F_{sp}$) to thrust the load of plate 15 and handle 13 thereon up to its "self-cleared" limit when assembly 11 is "at rest" (e.g. indicated in FIGURE 5); but much less than the normal operator force ($F_d$) to depress handle 13 (overcoming brake means 23), resiliently yielding thereto. The excursion limit of leveling springs 35, 35', and hence the tilt angle of plate 15, is carefully defined by the length (may be adjustable) of a pair of stop studs 39, 39' attached dependingly from plate 15 to pass slidingly through a pair of cooperating cutouts 41, 41' in frame 19. Studs 39, 39' thus include an enlarged terminal portion, located so as to limit the upward excursion of the front side 15–F of plate 15 under the urgings ($F_{sp}$) of springs 35, 35' and thus be tilted away from stack ST a prescribed clearance DD' above the foremost document therein (FIGURE 5).

Thus, as seen best in FIGURE 5, when the elements of alignment assembly 11 are assembled, springs 35, 35' and stops 39, 39' are so arranged as to normally float plate 15 pivoted away from frame 19 when assembly 11 is at rest and also when it is drawn upwardly (FIGURE 1). They also allow forward edge 15–F to be tipped toward frame 19 into contiguous coplanarity therewith when handle 13 is depressed (FIGURE 4) bringing plate 15 down so that the bottom surface thereof extends along reference alignment direction R. Plate 15 is arranged to project a prescribed distance O beyond frame 19, both to maintain an appreciable portion of stack ST in proper vertical alignment and to obstruct access to control switch 1. This upwardly canted overhang also provides an advantageous graduated camming of vertically protruding documents (if they are stiff enough) down to the reference level R.

In summary, assembly 11 may be pulled upwardly ($F_u$ FIGURE 1) to register a document stack against pillar 17; then depressed ($F_d$ FIGURE 4) to align plate 15 along reference direction R (see FIGURE 5), coplanar with frame 19, until the overhang O thereof engages the top of the stack to be registered therealong. Handle 13 is thus preferably overcentered along plate 15 toward edge 15–F (as shown) to provide this plate-stack registration positively. Such registration may also advantageously provide a fine vertical alignment of vertically protruding documents if they are stiff enough (e.g. punched cards). Having thus located the juncture of plates 15, 19 along a reference level (R) corresponding to the top of the document stack, brake means 23 will maintain this level; while the release of handle 13 will allow plate 15 to be tilted upwardly by springs 35, 35' a prescribed clearance DD' above the foremost document (see $F_{sp}$, FIGURE 5). Clearance DD' may be adjusted, e.g. according to the roughness of the top of stack ST, by stops 39, 39'.

Those skilled in the art will recognize that the front face 17–F of aligning pillar 17 serves to aim adjacent cards in stack ST for passage through the throat of the card handling apparatus. The width of face 17–F (along axis H) may, in itself, serve to maintain cards in this prescribed flat injection plane and prevent them from being bowed, at their ends, about pillar 17. However, to better assure this flattened condition, it may be advantageous to provide a pair of upper and lower lateral card guides 53, 57 respectively (indicated in phantom in FIGURE 4). Thus, lower card guide 57 may be attached along deck 10 in front of the base of pillar 17, while upper guide 53 may be similarly attached adjacent the top of pillar 17, the length and position of guides 53, 57 defining the prescribed document-injection plane which registers with the throat defined by TM. Upper guide 53 may preferably include a cutout 55 permitting access to toggle lever 5 of run-out switch 1. Upper guide 53 preferably also includes a central cutout 54 which is relieved a prescribed distance below the height of the "Shortest anticipated" documents, to facilitate access of the operator's fingers for gripping the stack.

It will be recognized that the new improved alignment and tamping assembly 11 described above provides a self-clearing, self-leveling document stack aligning means according to the invention. It will likewise be appreciated that assembly 11 and especially the overhanging portion of aligning plate 15 is arranged to provide and maintain height alignment as well as to advantageously cooperate with an engaged stack of documents to hide control means until the stack is removed. Thus, the indicated disposition of run-out switch 1 will provide the above-mentioned fail-safe functions of preventing operator access thereto without the prior removal of stack ST.

The principles of the invention described in the embodiment above may be implemented in a number of different ways, evident to those skilled in that art. The orientation of alignment assembly 11, for instance, may be changed so that the alignment direction is other than vertical; for instance, to align documents along a horizontal plane since it is advantageously relatively independent of gravity (of course gravitational effects may have to be accommodated by minor adjustments). Further, the braking means may be modified to function with equivalent structure; using equivalent resilient means and friction means and, in some cases, perhaps being eliminated entirely when the plunger can, of itself, be made to frictionally engage channel 18. Similarly, equivalent pivot mounting means, and resilient clearing means and associated stop means will occur to those skilled in the art. Likewise, it will be evident that run-out switch 1 may be relocated from the illustrated placement to be placed at any equivalent location where the structure of aligning assembly 11 together with the stack of documents ST engaged therewith will obstruct access to the control. Similarly, the guide means may comprise other than assembly 11; the body thereof may comprise other than frame 19 and plunger 21, etc., comprising one integral unit for instance; and the guiding surfaces of deck 10, pillar face, or stop means, 17–F and plate 15 may be otherwise provided.

While in accordance with the provisions of the statutes, there have been illustrated and described, the best forms of the invention known, it will be apparent to those skilled in the art that changes may be made in the form of the apparatus, the arrangement of parts and the like without departing from the spirit of the invention as set forth in the appended claims and that in certain cases, some features of the invention may be used to advantage or substituted for without a corresponding change or substitution in other features.

Having now described the invention, what is claimed as novel and for which it is desired to secure Letters Patent is:

1. In a document-feeding apparatus including document storage means adapted to hold a stack of documents placed therein; document-selection means disposed communicatingly adjacent one portion of said storage means and adapted to sequentially select documents from said stack for advancement to a utilization device, said selection means including throat means adapted to define a selection aperture for injection of said documents singly; and a document aligning surface disposed adjacent said portion of said storage means and arranged to engage a forward surface of said stack and to maintain said surface aligned for injection of documents through said aperture; the combination therewith comprising:

movable guide means mounted adjacent said aligning surface and including a frictionally-suspended frame portion and guide plate means mounted from said frame portion and arranged to be engaged along a second surface of said stack normal to said forward surface in tamping relation therewith when said guide means is thrust theretowards, said frame portion including resilient drag brake means adapted to resiliently thrust prescribed braking surfaces into braking engagement continually and with sufficient prescribed force such as to hold said guide plate suspended at a prescribed, selectable elevation.

2. In a document-handling arrangement including container means for presenting a stack of documents of identical height in prescribed alignment, the combination therewith of:

selectably positionable guide means disposed on said container means and adapted to restrain one edge of said stacked documents along a prescribed reference plane, said guide means including a movable body portion, fixed guideway means for aligning said body portion; resilient braking means arranged to engage said body portion against said guideway means a prescribed amount; and guide plate means mounted from said body portion and arranged to so align said edges along said plane.

3. The combination as recited in claim 2 wherein said plate means is resiliently mounted on said body portion to be self-clearing a prescribed distance from said document edges to accommodate free document translation from said stack.

4. The combination as recited in claim 2 wherein said document handling arrangement includes control switch means for controlling translation means operably associated with said stack in said container means, said switch means being disposed relative said guide means to be hidden from operator-access unless said stack is removed from operating association with said translation means.

5. In apparatus for withdrawing documents from a stack and advancing them along a feed path through utilization means in prescribed alignment therewith, the combination therewith comprising:

automatic aligning means including a first fixed aligning surface for supporting a stack of said documents of identical height along a prescribed base plane for engagement with said utilization device in prescribed registration therewith; a second fixed aligning surface arranged to intersect said first aligning surface normal thereto; selectably positionable guide means including a third movable guiding surface disposed relatively parallel to said first surface being adapted to urge said documents into stacked alignment thereagainst, said guide means being suspended to be moveable and to be self-locating in selectable alignment positions; said third aligning surface being mounted from said guide means to be self-clearing out of contiguity with said documents; and transport means disposed in prescribed positional relation with said guide means so that operator access thereto is obstructed by a stack of documents engaged with said guide means.

6. The combination recited in claim 5 wherein said third surface is pivotably journaled on said guide means and includes resilent means and associated limiting means to normally tilt said third surface above said stack to a prescribed clearance, while allowing manual depression thereof coplanar with said first surface.

7. The combination as recited in claim 6 wherein said guide means includes a plunger portion; wherein said second surface includes a guide channel portion conformingly engaged with said plunger portion said plunger portion including resilient means and associated friction means urged thereby against the confines of said channel portion a prescribed amount for self-location of said guide means at selectable elevations.

8. The combination as recited in claim 7 wherein said friction means comprise disc brake pads and wherein said plunger and channel portions include cooperating stop limit means.

9. In a mechanism for feeding cards like-dimensioned documents of variable height advanced thereto from a vertical upstanding stack thereof, apparatus for conditioning the vertical alignment of said stack comprising:

a first fixed base surface for supporting the bottom edge of said documents in prescribed relation with a utilization device; a second fixed side-aligning surface mounted on said base surface and disposed to align documents laterally to be successively fed to said utilization device in prescribed registration therewith; a selectively height-adjustable frame member mounted to be translatable relatively normal to said first surface, being self-locating at selectable elevations; guide plate means mounted on said frame member and adapted to be thrust against the top edge of said stack for alignment thereof relatively parallel to said first surface, said plate means being suspended on said frame member so as to be self-clearing a prescribed clearance distance above said stack.

10. The combination as recited in claim 9 wherein said second surface comprises part of a document engaging stop means; and wherein said guide plate means comprises a top aligning plate resiliently mounted upon said frame member to project beyond said stop means over said stack so as to align an edge thereof against said base surface, said plate means being resiliently floated away from said frame pivotingly to be normally spaced a prescribed clearance distance from a portion thereof to be self-clearing from said stack after aligning engagement therewith.

11. In the card feeding portion of a card handling apparatus wherein stacked cards are stored in prescribed alignment in a hopper to be urged toward a prescribed reference surface and an adjacent injection throat, for individual abstraction into the apparatus, the combination therewith of:

a reference plate comprising a portion of said reference surface and including a prescribed aperture therethrough; and a run-out switch assembly arranged to control the said apparatus under "empty hopper" conditions, said assembly being disposed in relative registry with said aperture for operator access substantially-only-therethrough, this disposition being such that access is practically blocked unless all cards are moved away from said reference plate.

12. In a card feeding portion of a card handling apparatus wherein a stack of cards is stored in a prescribed in-hopper to be urged toward a prescribed reference surface and an injection throat adjacent this surface, for individual abstraction into the apparatus, the combination therewith of height-adjustable alignment means comprising:

cover plate means adapted to be depressed aligningly onto a card stack in said hopper and suspension means mounting said plate means in manual-height-adjustable relation with such stacks in said hopper, said suspension means including a constantly applied friction means for maintaining a selected height of said plate means in self-locating fashion.

13. The combination as recited in claim 12 wherein said friction means comprises a drag brake assembly including braking spring means, adapted to be overridable for manual height-adjustments.

14. The combination as recited in claim 13 wherein said reference surface includes a prescribed aperture therethrough and wherein said apparatus includes run-out switch means disposed in registry with said aperture so that operator-access thereto is effectively blocked by the presence of cards in said hopper.

References Cited

UNITED STATES PATENTS 1,741,451 12/1929 Davidson ------------ 271—39

EDWARD A. SROKA, *Primary Examiner.*

UNITED STATES PATENT OFFICE

CERTIFICATE OF CORRECTION

Patent No. 3,379,435 April 23, 1968

Baisel L. Eveland et al.

It is certified that error appears in the above identified patent and that said Letters Patent are hereby corrected as shown below:

Column 8, line 10, "transport means" should read -- transport control means --.

Signed and sealed this 13th day of January 1970.

(SEAL)
Attest:

Edward M. Fletcher, Jr.
Attesting Officer

WILLIAM E. SCHUYLER, JR.
Commissioner of Patents